Sept. 5, 1961  F. S. BUONO  2,998,986
EXPANSION JOINT
Filed May 28, 1959

INVENTOR.
FRANK S. BUONO
BY WILLARD R. SPROWLS
ATTORNEY

United States Patent Office 2,998,986
Patented Sept. 5, 1961

2,998,986
EXPANSION JOINT
Frank S. Buono, Garfield, N.J., assignor to United States Rubber Company, New York, N.Y., a corporation of New Jersey
Filed May 28, 1959, Ser. No. 816,538
2 Claims. (Cl. 285—229)

This invention relates to flanged joints of reinforced rubber for joining pipes, and more particularly to joints of this type incorporating special liners which are unaffected by corrosive liquids.

Such liners extend through the length of the joint and on to the outer faces of the flanges of the joints to prevent the corrosive liquid from reaching and attacking the rubber and fabric portions of the joint. Because the liner material is relatively more expensive than the other materials of the joint, it has been the practice to stop the liner on the flange faces short of the bolt holes through the flanges to reduce the cost. This is permissible, inasmuch as the provision of liner material outwardly past the bolt holes provides no protection against the corrosive liquid leaking through the bolt holes and attacking the joint body.

Bolting pressure is applied to the flanges through an external rigid ring, commonly referred to as a retainer ring. The retainer ring engages the back sides of the flanges. It has been found, however, that even with the use of such a ring the corrosive liquid under maximum working pressure in combination with maximum expansion joint deflection will work up over the ends of the liner on the face of the flanges and attack the joint body. In accordance with the present invention it has been found that this leakage is apparently due to ineffective transmission of the bolting pressure to the liner on the face of the flanges, and that such leakage can be stopped by providing rigid discs embedded in the flanges and extending into the cylindrical body portions of the joint. These discs serve to transmit the bolting pressure from the retainer rings to the ends of the liner to provide an effective seal.

Figure 1:
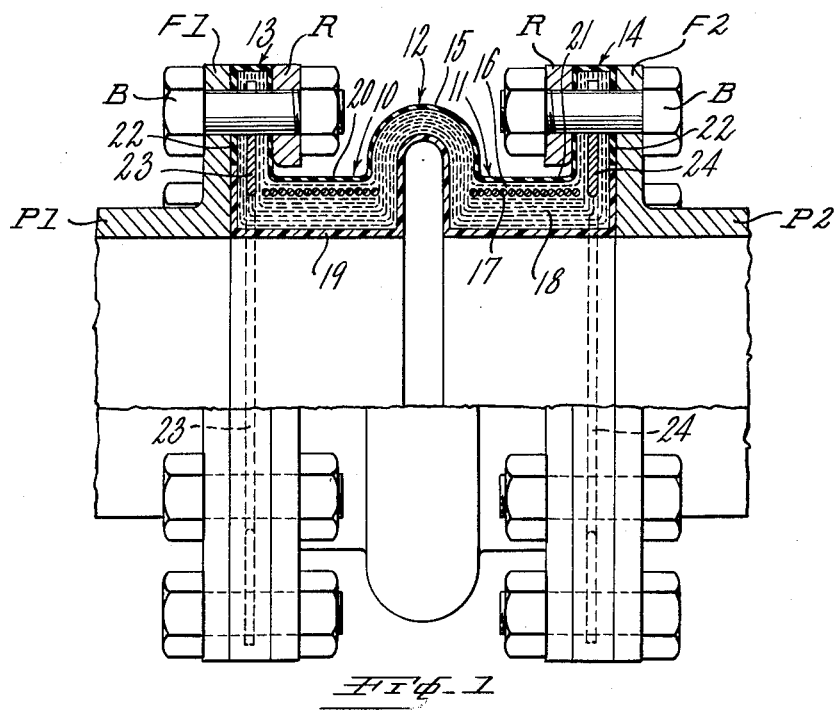
Figure 2:
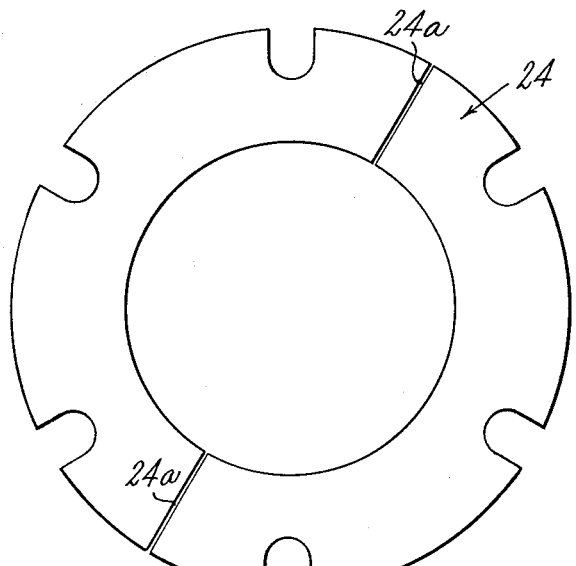

The invention having been broadly described, a more detailed description is given hereafter by reference to accompanying drawings wherein:

FIG. 1 is a view partly in elevation and partly in section showing a joint constructed in accordance with the present invention; and FIG. 2 is a face view of one of the discs which are embedded in the flanges of the joint.

Referring to the drawings, the particular joint illustrated is a flexible expansion joint. The joint includes two flanged, generally cylindrical portions 10 and 11 which are connected together by a central arch portion 12.

In the drawings, the expansion joint is shown used to couple two pipes P1 and P2 together by bolting flanges 13 and 14 of cylindrical portions 10 and 11 to flanges F1 and F2 of the pipes. The flanges 13 and 14, as well as the pipe flanges F1 and F2, are provided with suitable bolt holes extending completely throughout and through which coupling bolts B may pass. The bolting pressure of the bolts B is transmitted to the flanges 13 and 14 by retainer rings R.

The expansion joint, for the most part, is of conventional laminated construction and includes an outer rubber cover 15, layers of rubber coated or impregnated fabric plies 16, a layer of metal wire reinforcing 17, further layers of rubber coated or impregnated fabric plies 18, and a liner 19. The wires of layer 17 are laid in side abutting relation, each to the other and are disposed below the outer cover layer 15. One end layer 17 extends in close proximity to disc 23 (or 24) to be described hereafter. In large joints annular steel reinforcing rings may be used in place of the wire reinforcing 17. The liner 19 is commonly made of polytetrafluoroethylene or some other inert material which is unaffected by corrosive liquids. The liner extends onto the faces of the flanges 13 and 14 beyond the outer surfaces 20 and 21 of the cylindrical portions 10 and 11 but terminates short of the bolt holes through the flanges. The remainder of the faces of the flanges are covered with rubber 22.

The novel feature of the invention consists in the use of rigid discs 23 and 24 of metal, or other rigid material, embedded in and concentric with the flanges 13 and 14 and being relatively thin with respect to said flanges. The discs 23 and 24 extend inwardly beyond the outer surfaces 20 and 21 of the cylindrical portions 10 and 11 so that the discs and the liner are coextensive for a short distance. The discs 23 and 24 extend outwardly beyond the bolt holes and the bolt holes are extended through the discs. The discs are embedded in the flanges substantially centrally of the width thereof and are concentric therewith and extend inwardly beyond the plane of the outer cylindrical end portions and terminate short of the inner and outer radial extents of the fitting. When the liner material is of a fairly rigid material such as polytetrafluoroethylene, the discs 23 and 24 may be split as indicated at 24a of disc 24 in FIG. 2, to permit the disc to be placed over the flanged portions of the liner 19. In fabricating the joint the liner 19 is conveniently formed to the desired shape and the various plies of fabric, rubber and steel built up on the molded liner and the resultant assembly cured.

The discs 23 and 24 serve to transmit the bolting pressure exerted by the conventional steel retainer rings R to the edges of the liner 19 thereby ensuring effective sealing of the liner against the flanges of the pipes P1 and P2 to prevent leakage of corrosive liquids carried by the pipes past the edges of the liner extending on the faces of the flanges of the point, and thereby prevent such liquids from attacking and destroying the joint.

In order to provide a leak-proof joint, it is essential that each disc is rigid. The term "rigid" as used herein means that the disc or its equivalent possesses sufficient material so that under maximum bolting pressure and forces created by the deflection of the joint, the elastic limit of the disc is not reached and that no permanent deformation occurs. It has been found that a $\frac{1}{16}$ inch disc thickness is unsatisfactory and does not provide an effective seal, whereas a $\frac{1}{8}$ inch or greater disc thickness is adequate; for safety precautions, an internal pressure of 125 p.s.i. is assumed and a $\frac{3}{16}$ inch disc thickness is preferred.

The theory behind the use of the rigid disc is as follows: The steel disc embedded in the rubber flange is in reality a circular cantilever beam. In order to seal effectively, the joint must have a minimum bolting pressure at the flange face equal to the internal pressure, i.e. internal pressure 125 p.s.i., bolting pressure 125 p.s.i. minimum. When the joint is bolted in place the upper portion of the cantilever beam remains straight because it is uniformly supported on both sides. The section projecting out beyond the retaining ring R is caused to deflect due to the pressure developed by the semi-rigid flange. The fact that deflection occurs indicates the ring is acted upon by the aforesaid pressure. For every action there is an equal and opposite reaction; therefore the flange is also acted upon by the aforesaid pressure which tends to deflect the disc. It is this pressure, created by the bolting, transferred to the steel disc, which in turn is transferred to the liner that effects a pressure-tight seal.

While a preferred embodiment of the invention has been shown and described, it will be appreciated that variations can be made therein without departing from the scope of the invention. The term "rubber" is used in its generic sense to include natural rubber, synthetic rubber, and blends thereof.

Having thus described my invention, what I claim and desire to protect by Letters Patent is:

1. A flexible pipe joint adapted to be secured between two rigid conduit members, said joint being formed of plies of rubber and fabric and having cylindrical end portions provided with integral end flanges extending from the ends thereof, said flanges having bolt holes completely therethrough adapted to receive clamping bolt means for securing the joint to the flanged ends of pipes, said joint having the internal circumferential surface lined with inert material, said inert material also lining the outer faces of said flanges but terminating short of said bolt holes through said flanges, discs relatively thin with respect to said flanges embedded in said flanges substantially centrally of the width thereof and concentric therewith, said discs extending outwardly beyond said bolt holes and inwardly beyond the plane of the outer cylindrical end portions terminating short of the inner and outer radial extents of the fitting, reinforcing means comprising a layer of metal wires laid in side abutting relation to each other and disposed below the outer cover layer of each cylindrical portion and within the said plies of rubber and fabric and extending at one end in close proximity to one of said discs, a portion of said liner and the inner marginal edges of said discs being co-extensive, whereby bolting forces are transmitted to said liner and layer upon tightening of the bolt means, the liner being clamped against the flanges by the cantilever action of the disc and the layer being extended by the bolting forces applied through the disc, said reinforcing means tending to restrain axial bowing of the disc, said disc being of rigid material, whereby under maximum bolting pressure the elastic limit of said material is not reached.

2. A pipe joint as in claim 1 in which said disc is split at diametrically opposed sections.

References Cited in the file of this patent

UNITED STATES PATENTS

| 674,928 | Mauran | May 28, 1901 |
| 2,408,960 | Stivason | Oct. 8, 1946 |
| 2,787,289 | Press | Apr. 2, 1957 |
| 2,879,804 | Hammond | Mar. 31, 1959 |

FOREIGN PATENTS

| 547,375 | Great Britain | Aug. 25, 1942 |
| 763,972 | Great Britain | Dec. 19, 1956 |